United States Patent
Victor et al.

(10) Patent No.: US 12,201,907 B2
(45) Date of Patent: *Jan. 21, 2025

(54) LIVE GAMEPLAY UPDATES

(71) Applicant: Electronic Arts Inc., Redwood City, CA (US)

(72) Inventors: Nitish Victor, Redwood City, CA (US); Navid Aghdaie, San Jose, CA (US); Harold Henry Chaput, Castro Valley, CA (US); Sundeep Narravula, Saratoga, CA (US); Kazi Atif-Uz Zaman, Foster City, CA (US)

(73) Assignee: Electronic Arts Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/363,337

(22) Filed: Aug. 1, 2023

(65) Prior Publication Data

US 2024/0001240 A1    Jan. 4, 2024

Related U.S. Application Data

(63) Continuation of application No. 17/131,108, filed on Dec. 22, 2020, now Pat. No. 11,752,434.

(51) Int. Cl.
*A63F 13/60* (2014.01)
*A63F 13/30* (2014.01)
(Continued)

(52) U.S. Cl.
CPC .............. *A63F 13/60* (2014.09); *A63F 13/30* (2014.09); *A63F 13/35* (2014.09); *A63F 13/67* (2014.09); *A63F 13/77* (2014.09); *A63F 13/79* (2014.09)

(58) Field of Classification Search
CPC .......... A63F 13/60; A63F 13/30; A63F 13/35; A63F 13/67; A63F 13/77; A63F 13/79
See application file for complete search history.

(56) References Cited

U.S. PATENT DOCUMENTS

| 8,210,925 B2 * | 7/2012 | Johnson ................. A63F 13/35 463/24 |
| 11,752,434 B2 * | 9/2023 | Victor ..................... A63F 13/60 463/43 |

(Continued)

OTHER PUBLICATIONS

"Dynamic Loading", retrieved on Oct. 29, 2020, at <<https://en.wikipedia.org/w/index.php?title=Dynamic_loading&oldid=985975339>>, 8 pgs.

(Continued)

*Primary Examiner* — Justin L Myhr
*Assistant Examiner* — Carl V Larsen
(74) *Attorney, Agent, or Firm* — Lee & Hayes, P.C.

(57) ABSTRACT

A system and method for providing live gameplay updates receives a modification for a videogame, the modification affecting a gameplay aspect of the videogame during execution of the videogame. The system and method determine a target group for deploying the modification. The target group includes first one or more live instances of the videogame. The system and method deploy the modification to the target group and receive gameplay data associated with the gameplay aspect from the target group. The system and method deploy the modification to second one or more live instances of the videogame based at least in part on an analysis of the received gameplay data.

20 Claims, 6 Drawing Sheets

(51) Int. Cl.
*A63F 13/35* (2014.01)
*A63F 13/67* (2014.01)
*A63F 13/77* (2014.01)
*A63F 13/79* (2014.01)

(56) References Cited

U.S. PATENT DOCUMENTS

| | | | | |
|---|---|---|---|---|
| 2006/0046854 | A1* | 3/2006 | Arevalo Baeza | A63F 13/12 463/42 |
| 2006/0105841 | A1* | 5/2006 | Rom | A63F 13/61 463/42 |
| 2006/0128471 | A1* | 6/2006 | Willis | A63F 13/30 463/42 |
| 2006/0223600 | A1* | 10/2006 | Wisdom | A63F 13/30 463/1 |
| 2009/0113251 | A1* | 4/2009 | Goossen | A63F 13/00 702/183 |
| 2010/0144430 | A1* | 6/2010 | Graham | A63F 13/73 463/29 |
| 2010/0144444 | A1* | 6/2010 | Graham | A63F 13/60 463/42 |
| 2010/0210359 | A1* | 8/2010 | Krzeslo | A63F 13/213 463/31 |
| 2011/0124409 | A1* | 5/2011 | Baynes | A63F 13/67 463/43 |
| 2012/0077596 | A1* | 3/2012 | Ocko | G07F 17/3234 463/42 |
| 2013/0303244 | A1* | 11/2013 | Jensen | A63F 13/63 463/1 |
| 2014/0106837 | A1* | 4/2014 | Lambert | A63F 1/18 707/812 |
| 2014/0179408 | A1* | 6/2014 | Ducheneaut | A63F 13/63 463/23 |
| 2014/0200959 | A1* | 7/2014 | Sarb | G06Q 30/0202 705/7.31 |
| 2015/0231502 | A1* | 8/2015 | Allen | A63F 13/47 463/42 |
| 2022/0193552 | A1 | 6/2022 | Victor et al. | |

OTHER PUBLICATIONS

Jimo, "Opting in and out of Stema Client and Product Betas", retrieved Dec. 15, 2021, at <<https://steamcommunity.com/sharedfiles/filedetails/?id=182912431>>, 2015, 8 pgs.

Office Action for U.S. Appl. No. 17/131,108, mailed on Feb. 17, 2023, Nitish Victor, "Live Gameplay Updates", 8 pgs.

Office Action for U.S. Appl. No. 17/131,108, mailed on Dec. 21, 2021, Victor, "Live Gameplay Updates", 19 pgs.

Office Action for U.S. Appl. No. 17/131,108, mailed on Mar. 31, 2022, Victor, "Live Gameplay Updates", 22 pgs.

* cited by examiner

LIVE GAMEPLAY UPDATES

CROSS-REFERENCE TO RELATED APPLICATION

This application is a continuation of and claims priority to U.S. application Ser. No. 17/131,108, filed on Dec. 22, 2020 and entitled "LIVE GAMEPLAY UPDATES," the entirety of which is incorporated herein by reference.

BACKGROUND

Computer gaming allows for players to play a variety of electronic and/or videogames singularly or with each other via network connectivity, such as via the Internet. Computer gaming may be enabled by gaming system(s) where each of the players may connect using their respective client devices (such as console gaming devices, laptops, desktop computers, or mobile devices). The gaming experience can be improved or changed by adjusting game parameters or by providing additional, or alternative, cartography or level design. Such parameters are loaded when a game instance loads or boots, and conventionally, cannot be changed during execution of the game instance.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
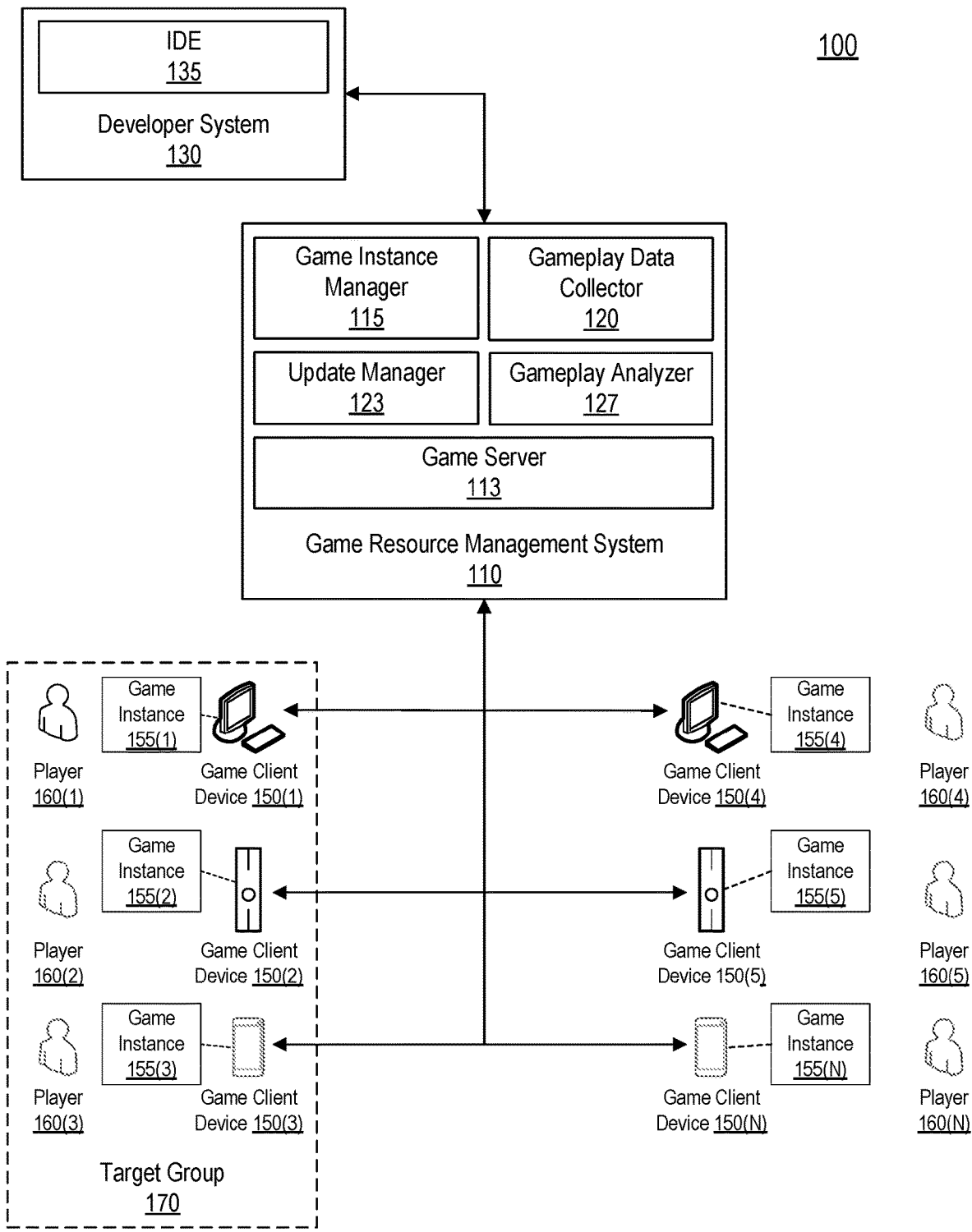
FIG. 1 illustrates a schematic diagram of an example computing environment for live gameplay updates consistent with disclosed embodiments.

Example embodiments of this disclosure describe methods, apparatuses, computer-readable media, and system(s) for deploying live gameplay updates to game instances executing on game client devices within a computer gaming network.

Traditionally, updates or modifications to videogames are distributed to computer systems executing the videogame through binaries deployed via network connections or through binaries stored on computer readable media, such as read only memory (ROM) cartridges or memory cards. In the context of videogames distributed over ROM, updates may not occur until the next version release of the videogame, which may be infrequent. In addition, the production and distribution of ROM updates is expensive and cumbersome.

Updates for videogames distributed via network connections can also be cumbersome. For example, many videogames are packaged in binaries or file collections that are tightly integrated requiring distribution of updates to include redeploying a large binary distribution that is similar in size, or larger than, the originally deployed binary. As a result, managing updates of videogames can be a resource intensive task or may require undesirable download times for users.

In addition, to help ensure speedy execution of videogames, many videogames rely on an architecture whereby most of the code is loaded into the random access memory (RAM) of the computing device executing the game upon the game's initialization. Since the code is loaded into the RAM of the computing device during initialization, it can be impossible to provide updates to an instance of the game during gameplay. In situations where rapid updates are desirable, such as live beta testing or dedicated and segregated prelaunch testing, the ability to provide updates while a game instance is live, or executing, can be desirable.

Accordingly, the embodiments of the present disclosure seek to provide a system for providing live gameplay updates or updates to instances of a videogame while they execute. The embodiments disclosed herein described a game architecture whereby some aspects of the videogame are immutable and cannot be changed while the game instances execute, whereas others are adjustable or configurable during execution. The embodiments disclosed herein contemplate a computing environment whereby live gameplay updates are distributed by a game resource management system to a target group of game instances executing on game client devices. The live gameplay update may relate to a certain aspect of gameplay. Upon receiving the distribution, the game client devices within the target group provide gameplay data related to the gameplay aspect to the game resource management system. When the gameplay data indicates that the live gameplay update enhances the gaming experience (e.g., increases gameplay engagement), the live gameplay update may be deployed to game instances outside of the target group.

Consistent with disclosed embodiments, live gameplay updates can be incorporated into a game instance while the game instance is executing. Periods of execution can include, but are not limited to, periods of active game play, configuration, selection of options, or other periods of operation where a player engages with the videogame. Periods of execution can also include, but are not limited to, periods of time related to initializing, booting, coming online, launching, or other operations of the game instance related to its start-up or activation for gameplay. Execution can also include periods of time when the game instance is in an idle or low-activity state, when the game instance performs operations at the end of a gaming session. In embodiments where game instances relate to multi-player, distributed video games, execution of a game instance can also include matchmaking operations.

As a nonlimiting example use case, game client devices may execute an instance of a videogame related to football. The players in the football game may have different skill scores measured on a scale of 0 to 100 relating to the players' abilities such as speed, accuracy, strength, agility, catching, or power. To enhance the realism of the football game, the skill scores may be updated from time to time to match the ability of the virtual players within the football game to their real-life counterparts. The development team of the videogame may want to evaluate the impact on gameplay for a modification to skill scores before rolling out the modification to all game instances. Therefore, the development team desires to deploy the modification on a small scale to a discrete set of game instances and measure the impact of the modification on engagement for those instances before widespread deployment.

Using the embodiments disclosed herein, the development team can select using one or more developer computer systems-a target group of game instances for testing the modification. For example, the development team may want to test the modification on certain gaming platforms or with users of the videogame of a certain skill level. The developer computer system may package the modification along with criteria defining which game instances should receive the modification. The developer computer systems may send that package to a game resource management system networked with game client devices executing the game instances matching the criteria.

The game resource management system may then deploy the modified skill scores to game instances executing on game client devices that are connected to the game resource management system. After the game client devices receive the modified player skill scores, the game client devices can provide gameplay data to the game resource management system which can be evaluated for determining the impact of the modified skill scores on gameplay. The gameplay data can include, for example, how long a user of the videogame has played the game instance or how frequently the user the videogame returns to play the game.

The game resource management system may then provide the gameplay data to the developer computer systems and the development team can then make decisions as to whether the modified skill scores ought to be deployed to all users of the football game.

Another use case example can pertain to updates to videogame cartography. For example, in role-playing games (RPGs), battle royale style games, or 3D platforming style games, the systems and methods described herein can be used to change the map of the game to alter the videogame to provide gameplay diversity. Gameplay diversity, in turn, may result in higher player engagement and a more enjoyable experience for frequent players. Using the example embodiments of the present disclosure, a development team can distribute a live gameplay update that alters that cartography of a game to a target group, collect gameplay date from the target group, and determine whether the alteration in cartography enhances player engagement. As with the examples and other use cases described in this disclosure, updates are deployed to live game instances, and game client devices need not restart the game instance for the update to take effect.

Another use case example can pertain to comparing two (or more) potential live gameplay updates. In this use case, the development team may develop two live gameplay updates and cause them to be deployed to a first target group and a second target group. The development team may collect gameplay data from both the first target group and second target group and determine which of the two live gameplay updates is more effective for enhancing player engagement.

The above examples are provided for explanation purposes only and to provide context as to how the disclosed embodiments may be useful in application. These examples do not the disclosed embodiments to these applications, and persons of skill in the art will appreciate that the embodiments disclosed herein can be applied to various applications without departing from the spirit and scope of the present disclosure.

Certain implementations and embodiments of the disclosure will now be described more fully below with reference to the accompanying figures, in which various aspects are shown. However, the various aspects may be implemented in many different forms and should not be construed as limited to the implementations set forth herein. It will be appreciated that the disclosure encompasses variations of the described embodiments. Like numbers refer to like elements throughout.

FIG. 1 illustrates a schematic diagram of an example computing environment 100 providing live gameplay updates according to disclosed embodiments. The example computing environment 100 can include a game resource management system 110, a developer system 130, and game client devices 150(1), 150 (2), 150(3), . . . 150(N) (individually or collectively game client devices 150). Each of the game client devices 150 may execute a game instance 155 (e.g., respective game instances 155(1), 155 (2), 155(3), . . . 155(N)). The example computing environment 100 can also include one or more players 160 operating respective game client devices (e.g., respective players 160 (1), 160(2), 160(3) . . . 160(N)).

According to some embodiments, the game resource management system 110 can include one or more components supporting games and game instances 155 executing on game client devices 150. For example, the game resource management system 110 can include a game server 113. The game server 113 can provide games to game client devices 150 or manage connections between game client devices 150 for gameplay. For example, the game server 113 can provide communication or matchmaking between the game client devices 150 to allow their respective players 160 to engage in collaborative or competitive play. In some embodiments, computing environment 100 may allow for streaming of videogames, e.g., game logic and processing are executed on a server and client devices (such as game client devices 150) merely provide an input/output device for players 160. In such embodiments, the game server 113 may functionally act as a gaming system and execute game instances 155. Although the example computing environment 100 shows game instances 155 executing on game client devices 150, game instances 155 may execute within the game server 113 in some embodiments without departing from the spirit and scope of the present disclosure.

The game resource management system can also include a game instance manager 115. Consistent with disclosed embodiments, the game instance manager 115 may perform operations related to identifying game client devices 150 and/or game instances 155 for which live gameplay updates may be deployed. For example, in the example computing environment 100 of FIG. 1, the game client devices 150(1), 150(2), 150(3) respectively executing game instances 155 (1), 155(2), 155(3) form part of a target group 170. A target group 170 can be a group of game client devices 150 or game instances 155 for which a live gameplay update or modification is deployed for testing or trial purposes before the update is deployed to other game client devices 150 or game instances 155. The game instance manager 115 may perform operations to identify the game instances 155 for the target group 170. According to some embodiments, the game instance manager 115 may manage one or more lists, maps, or data structures identifying which of game client devices 150 or game instances 155 are part of a target group 170.

The game resource management system 110 can also include a gameplay data collector 120. The gameplay data collector 120 can be in communication with the game client devices 150 to collect gameplay data from game instances 155 executing on the game client devices 150. The gameplay data collector 120 can collect, for example, engagement metrics related to the engagement of players 160 with game instances 155. Engagement metrics can include, among other things, the length of time or frequency players 160 engage with a game, how often players visit or revisit areas (e.g., cartography regions, sub-games, mini games) within the game, or the frequency and length of time players 160 play against simulated players or live players. The gameplay data collector 120 can also collect gameplay data related to progression through a game of players 160 or the ability of players 160 to complete a task or quest within the game. For some games, such as RPG or adventure games, the gameplay data collector 120 can collect gameplay data associated with how often players 160 visit or revisit certain locations within the game or whether the players 160 discover or use objects within the game.

The game resource management system 110 can also include an update manager 123. The update manager 123 can perform operations related to distributing live gameplay updates to game client devices 150 and game instances 155. According to some embodiments, the update manager 123 can receive information related to a live gameplay update or modification from the developer system 130. The update manager 123 may also be responsible for deploying live gameplay updates to members of the target group 170. In some embodiments, the update manager 123 deploys live game play updates to game client devices 150 and game instances 155 outside of the target group 170 once the live gameplay update has been approved for wider distribution.

In some embodiments, the update manager 123 may deploy live gameplay updates by sending a modification distribution to game client devices 150 and game instances 155. The game client devices 150 may be configured to detect receipt of the modification distribution and perform operations to incorporate the live gameplay update into game instances 155. For example, the game client devices 150 may copy portions of the modification distribution to its memory, which may overwrite, replace, or modify corresponding game parameters or dynamically loadable binaries of the game instances 155 executing on the game client devices 150.

In some embodiments, the update manager 123 may communicate with the game client devices 150 during deployment of live gameplay updates to determine progress of a deployment, receive error messages or exceptions, and take corrective actions. For example, during an attempted deployment, if a game client device 150 cannot successful incorporate the live gameplay update during a game instance 155, the game client device 150 may provide an error message to the update manager 123. The update manager 123 may attempt to send the modification distribution again, or in some embodiments, may provide an instruction to the game client device 150 to attempt incorporation of the live gameplay update once the game instance 155 of the game client device 150 ceases execution. The game client devices 150 may attempt to incorporate the modification distribution several times before notifying the update manager 123 of a failed attempt.

The game resource management system 110 can also include a gameplay analyzer 127. The gameplay analyzer 127 can perform operations consistent with the disclosed embodiments related to analyzing gameplay data collected by the gameplay data collector 120. For example, the gameplay analyzer 127 may analyze the gameplay data to determine whether a live gameplay update has increased engagement of players 160 with the game instances 155 that have received a live gameplay update. According to some embodiments, the gameplay analyzer 127 may prepare reports or other analysis information of the gameplay data and provide it to the developer system 130, thereby allowing a user of developer system 130 to make decisions about whether a live gameplay update should be deployed to game client devices 150 or game instances 155 that are outside of the target group 170.

In some embodiments, the gameplay analyzer 127 can collaborate with the update manager 123 to deploy live gameplay updates to those game client devices 150 and game instances 155 outside of the target group 170 based on criteria that is been provided to the gameplay analyzer 127 by the developer system 130. For example, the developer system 130 may indicate that if player engagement metrics show a 10% increase in player engagement based on a live gameplay update deployed to the target group 170, the update manager 123 is to deploy the live gameplay update to game instances 155 outside of the target group 170. In such an example, the gameplay analyzer 127 may analyze gameplay data collected by the gameplay data collector 120 to determine whether the engagement metrics collected show the 10% increase.

The developer system 130 can be a computing system including a processor and a computer readable medium storing instructions that when executed by the processor perform operations allowing for the development of a videogame. As one example, the computer readable medium of the developer system 130 can include instructions that when executed launch an integrated development environment (IDE) 135 for videogame development. The IDE 135 can provide a user interface allowing a user of the developer system 130 to write game code, analyze gameplay data, and prepare modification packages including live gameplay updates, as disclosed herein. The IDE 135 can also display analytics prepared by the gameplay analyzer 127 to inform the user of the developer system 130 as to the efficacy of a live gameplay update.

In some embodiments, the IDE 135 allows a user of the developer system 130 to established criteria for whether a game client device 150, a game instance 155, or player 160 should be included within the target group 170. For example, the IDE 135 may provide user interface elements allowing the user of the developer system 130 to specify the skill level of players 160, the geographic location of game client devices 150, specific game instances 155 (e.g., by serial number of game instance), or type of game client device (e.g., console device, PC, mobile device, or specific platform) that should be included within a target group 170.

The game client devices 150 may receive game state information from the game resource management system 110. For example, game server 113 may host aspects of the game instances 155 or facilitate matchmaking between players playing game instances 155 of the same game. The game state information may be received repeatedly and/or continuously and/or as events of the game transpire. The game state information may be based at least in part on the interactions that each of the players 160 has in response to events of the game hosted by the game server 113. The game client devices 150 may be configured to render content associated with the game to respective players 160 based at least on the game state information. More particularly, the game client devices 150 may use the most recent game state information to render current events of the game as content. This content may include video, audio, haptic, combinations thereof, or the like content components.

As events transpire in the game instances 155, the game server 113 of the game resource management system 110 may update game state information and send that game state information to the game client devices 150. For example, if the players 160 are playing an online soccer game, and the player 160 playing one of the goalies moves in a particular direction, then that movement and/or goalie location may be represented in the game state information that may be sent to each of the game client devices 150 for rendering the event of the goalie moving in the particular direction. In this way, the content of the game is repeatedly updated throughout game play.

When the game client devices 150 receive the game state information from the game server 113, a game client device 150 may render updated content associated with the game to its respective player 160. This updated content may embody events that may have transpired since the previous state of the game (e.g., the movement of the goalie).

The game client devices 150 may accept input from respective players 160 via respective input devices. The input from the players 160 may be responsive to events in the game. For example, in an online basketball game, if a player 160 sees an event in the rendered content, such as an opposing team's guard blocking the point, the player 160 may use his/her input device to try to shoot a three-pointer. The intended action by the player 160, as captured via his/her input device, may be received by the game client device 150 and sent to the game server 113.

The game client devices 150 may be any suitable device, including, but not limited to a Sony Playstation® line of systems, a Nintendo Switch® line of systems, a Microsoft Xbox® line of systems, any gaming device manufactured by Sony, Microsoft, Nintendo, or Sega, an Intel-Architecture (IA)® based system, an Apple Macintosh® system, a netbook computer, a notebook computer, a desktop computer system, a set-top box system, a handheld system, a smartphone, a personal digital assistant, combinations thereof, or the like. In general, the game client devices 150 may execute programs thereon to interact with the game resource management system 110 and render game content based at least in part on game state information received from the game server 113. Additionally, the game client devices 150 may send indications of player input to the game server 113. Game state information and player input information may be shared between the game client devices 150 and components of the game resource management system 110 using any suitable mechanism, such as application program interfaces (APIs).

In some embodiments, the game server 113 may receive inputs from various players 160 via game client device 150 and update the state of the online game based them. As the state of the online game is updated, the state may be sent to the game client devices 150 for rendering online game content to players 160. In this way, the game server 113 may host the online game.

Figure 2:
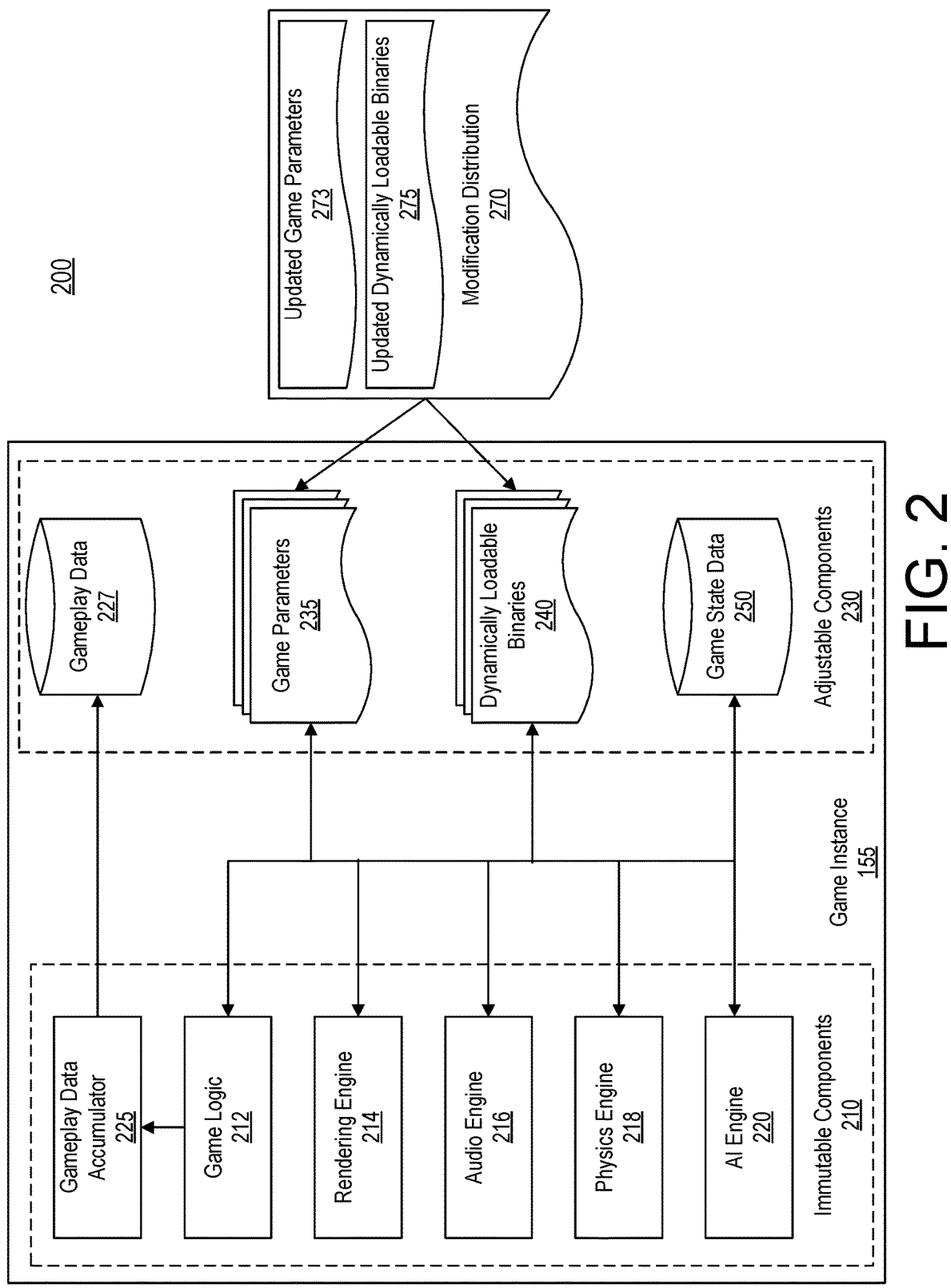
FIG. 2 illustrates a schematic diagram of an example game architecture providing for live gameplay updates consistent with disclosed embodiments.

FIG. 2 illustrates an example game architecture 200 of a game instance 155 utilizing parameters or libraries that can be modified while the game instance 155 is executing. The game instance 155 shown in FIG. 2 is just one example of a game architecture 200 enabling live gameplay updates, and the components described with respect to FIG. 2 may not be present in all embodiments of game architectures of videogames or game instances enabling live gameplay updates. Accordingly, the architecture 200 is presented for example and explanation purposes only and is not meant to limit the scope of game instances 155 of the disclosed embodiments. In addition, while the description below refers to a particular a game instance 155, those with skill the art will appreciate that the game instance 155 is but an example.

The game instance 155 of example architecture 200 can include immutable components 210 that are instantiated or loaded into memory at the time a game client device 150 launches game instance 155. According to some embodiments, the immutable components 210 include code, images, audio, or other information that remain static from the point the game instance 155 begins execution until it terminates. For example, the immutable components 210 may load into memory when the game instance 155 begins, such as when a player 160 begins playing a game and remain unchanged and unmodified until the game instance 155 terminates, such as when a player 160 stops playing the game. In some embodiments, the immutable components 210 are write protected or read only.

According to some embodiments, the immutable components 210 can include game logic 212, a rendering engine 214, an audio engine 216, a physics engine 218, and an AI engine 220 that collectively provide the primary gameplay aspects of the game instance 155. For example, the game logic 212 can provide the main and essential aspects of a game's gameplay separate from graphics rendering, audio cues, specific physical rules of the game, or the behavior of computer-controlled characters within the game. The rendering engine 214 according to some embodiments, contains code that generates graphics and/or the logic to render graphics based on rules of gameplay. The audio engine 216 can include code that relates to the output of sound during gameplay. In some embodiments, the physics engine 218 can be responsible for simulating the laws of physics within the game, such as simulating collisions, trajectories of bullets or other projectiles, the arcs or ricochets of balls within the sports game, or the like. The AI engine 220 can include code that dictates the behavior of computer-controlled sprites, characters, enemies, or other simulated players within the game.

In some embodiments, the immutable components 210 can also include a gameplay data accumulator 225 that collects gameplay data 227 related to gameplay during the execution of the game instance 155. The gameplay data 227 can include data related to player engagement. For example, the gameplay data 227 can include the length of time a player plays the game, the amount of time a player spends on particular levels within the game, the frequency with which a player plays a game, the frequency with which a player plays a particular level, the amount and frequency with which a player engages with other live players or simulated players, the success of a player in head-to-head matchups versus other live players or simulated players, how often a player engages in collaborative gameplay with other players either live or simulated, or a player's success rate for attempting certain tasks in the game, as just some examples. The gameplay data accumulator 225 may collect gameplay data 227 from the game instance 155 over time and gameplay data 227 may persist over several game instances that have executed on game client device 150. The gameplay data accumulator 225 may provide the gameplay data 227 to the gameplay data collector 120 of game resource management system 110. In some embodiments, the gameplay data accumulator 225 provides the gameplay data 227 on a periodic basis and during execution of the game instance 155.

According to some embodiments, example architecture 200 can include adjustable components 230. The adjustable components 230 may differ from the immutable components 210 in that adjustable components 230 can be altered during execution of the game instance 155. For example, as the game instance 155 executes, the gameplay data accumulator 225 may add additional data to the gameplay data 227. In addition to the gameplay data 227, the adjustable components 230 can also include game parameters 235 and dynamically loadable binaries 240 described below. The adjustable components can also include game state data 250, which can include player progress through a game, as just one example.

Game parameters 235 can include values accessed during gameplay by the immutable components 210. In some embodiments, the game parameters 235 include data or properties that can be called as needed during execution of game instance 155, and typically do not include game logic or other code having control flow properties. For example, in a soccer game, a shooting accuracy game parameter can be stored among the game parameters 235 that affects the precision with which a player must press input controls to score a goal with the soccer ball or execute a pass to another player. The shooting accuracy game parameter may be numerical value between 0 and 100, as just one example. As another example, in a football game, the game parameters 235 may relate to speed or strength numerical values associated with particular players. The game parameters 235 can also relate to visual aspects of the game. For example, the game parameters 235 may include pixel color values related to the colors of characters within the game or relate to filenames for rendering sprites or backgrounds within the game.

Dynamically loadable binaries 240 can include, among other things, binary code that is executed on-demand by one or more of the immutable components 210 of the game instance 155. In contrast to the code of the immutable components 210, the code of the dynamically loadable binaries 240 may not be loaded into memory upon instantiation of the game instance 155 and may be loaded by game client devices 150 when execution of the game instance 155 reaches a particular branch. As one example, a dynamically loadable binary 240 can include code related to a particular level of the game. The level may not be loaded upon instantiation of the game instance 155, but once a player reaches a point in the game where it may access the level, the game logic 212 and the rendering engine 214 may access the dynamically loadable binary 240 associated with the level so that the player may play it.

As another example, the dynamically loadable binaries 240 can include code executed by the rendering engine 214 to render a secret or hidden mini game within a game or render a new character within the game. The dynamically loadable binaries 240 can also include binaries that affect the physics of the game (e.g., which could be executed by the physics engine 218), or could also include code related to the behavior of new or existing characters or players within the game (e.g., which could be executed by the AI engine 220). The primary difference between code of the dynamically loadable binaries 240 and the code of immutable components 210 is that the code of dynamically loadable binaries 240 can be modified or replaced while the game instance 155 is executing and with minimal disruption to the execution of the game instance 155.

By separating the immutable components 210 and the adjustable components 230, the architecture 200 provides for allowing live gameplay updates or updates to the game instance 155 while the game instance 155 is executing. The architecture 200 provides for live gameplay updates by segregating aspects of the game instance 155 that can be accessed during gameplay, such as game parameters 235 and dynamically loadable binaries 240, from aspects of the game that are loaded upon instantiation of the game instance 155, such as the game logic 212, the rendering engine 214, audio engine 216, the physics engine 218, the AI engine 220, and they gameplay data accumulator 225.

The example architecture 200 also provides for accepting a modification distribution 270 and loading it during gameplay and execution of the game instance 155. A modification distribution 270 can include updated game parameters 273 and/or updated dynamically loadable binaries 275. The modification distribution 270 may be provided to the game client device 150 by game resource management system 110. The updated game parameters 273 and the updated dynamically loadable binaries 275 may modify some of game parameters 235 dynamically loadable binaries 240. As the game parameters 235 and dynamically loadable binaries 240 are accessed on demand by the immutable components 210, the modification distribution 270 can provide a live gameplay update to the game instance 155 without disrupting its execution or requiring a restart thereby avoiding disruption of gameplay by players 160.

Figure 3:
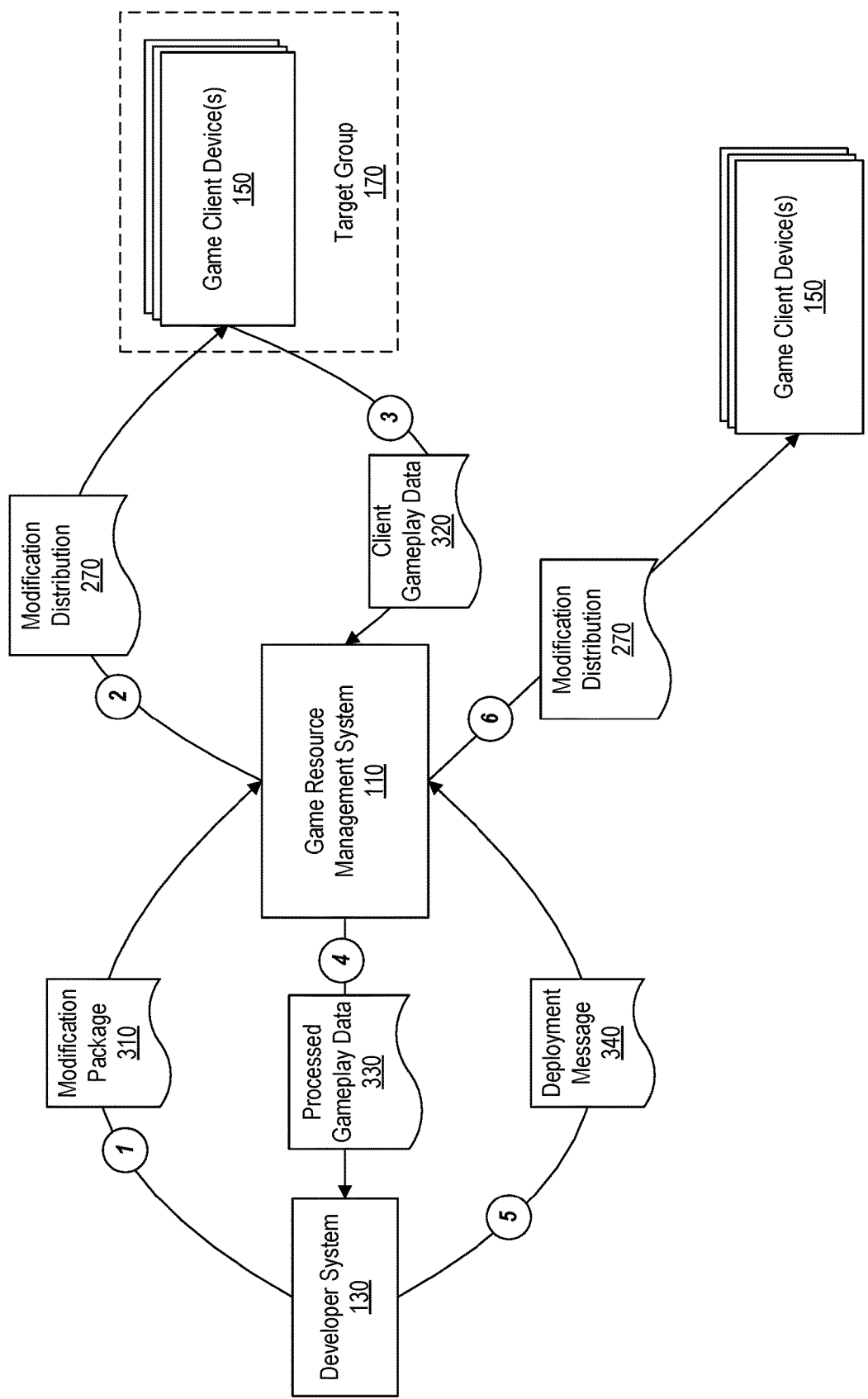
FIG. 3 illustrates a data flow diagram showing an example flow of data between components of the example computing environment of FIG. 1 consistent with disclosed embodiments.

FIG. 3 is a data flow diagram 300 showing the data flow of an example live gameplay update between various systems of the computing environment 100 such as the developer system 130, the game resource management system 110, and game client devices 150.

According to some embodiments, a developer system 130 prepares a modification package 310 and provides the modification package 310 to the game resource management system 110. The modification package 310 can include, among other things, the modification distribution 270 and criteria for selecting the target group 170 to which the modification distribution 270 is to be deployed. For example, the modification package 310 can include either updated game parameters 273, updated dynamically loadable binaries 275, or both. The modification package 310 can also include selection criteria for the target group 170. The selection criteria can include, among other things, information about the player 160 (e.g., skill level, engagement, game-type preferences, social network contacts, typical times of engaging with games) to identify players 160 for the target group. Selection criteria can also include information about game client devices 150 executing game instances 155 such as the type of device (e.g., console device, mobile device, or PC etc.) executing game instance 155 or the platform of the game client device. The selection criteria can also include geographic information related to the game client device.

The selection criteria included within modification package 310 can include the identity of specific game instances 155 or players 160 that are to be part of the target group 170, in some embodiments. This may be helpful for facilitating beta testing. For example, some players 160 may opt-in to a trial for live gameplay updates and the selection criteria can include identifiers related to the players 160 that of opted in. As another example, during testing of a new game, or a new version of the game, players 160 may be part of a white room testing environment to test the efficacy of a live gameplay update or to evaluate whether the live gameplay update enhances or diminishes the player experience. In such examples, the selection criteria of the modification package 310 may identify those game client devices 150 that are part of the white room testing environment. While the above describes certain examples of selection criteria that can be part of the modification package 310, persons of skill the art will appreciate that other selection criteria may be used to identify either specific players 160 or specific game instances 155 to be included within the target group 170 without departing from the spirit and scope of the present disclosure.

Once the game resource management system 130 receives the modification package 310, it can determine the target group 170 based on the information provided in the modification package 310. Once the target group 170 has been determined, the game resource management system 110 can provide the modification distribution 270 to the game client devices 150 that are part of the target group 170.

As the game client devices 150 of the target group 170 execute their game instances 155, they can provide client gameplay data 320 to the game resource management system 110. In some embodiments, the game resource management system 110 can process the received client gameplay data 320 and analyze it. The analyze client gameplay data 320 can include gameplay data that has been consolidated, averaged, or placed in reports. The game resource management system 110, in some embodiments, may take action based on the client gameplay data 320 it receives. For example, the game resource management system 110 may deploy the modification distribution 270 to the game client devices 150 outside of the target group 170 if the client gameplay data 320 shows that certain thresholds or parameters have been satisfied. For example, if the client gameplay data 320 shows that a certain cartography of the game has been explored by more than 20% for game instances 155 executing within the target group 170, the game resource management system 110 may deploy the modification distribution 270 to game client devices 150 outside the target group. In other embodiments, statistics related to gameplay engagement such as frequency of gameplay, length of time of gameplay, or frequency and length of time related to certain aspects of gameplay can be packaged by game resource management system 110 and provided to the developer system 130 as processed gameplay data 330.

While in some embodiments, the game resource management system 110 can be configured to deploy the modification distribution 270 to game client devices 150 outside of the target group 170 based on data thresholds related to client gameplay data 320, the developer system 130 can also provide a deployment message 340 to the game resource management system 110. The deployment message 340 may provide an indication to the game resource management system 110 that the modification distribution 270 is to be deployed to one or more game client devices 150 outside of the target group 170.

In one example use case, the developer system 130 receives processed gameplay data 330. The developer system 130 may display the processed gameplay data 330. For example, the IDE 135 executing on developer system 130 may display graphs, charts, and/or tables summarizing the processed gameplay data 330 in a user interface. A user operating the developer system 130 may review the processed gameplay data 330 and determine that the live gameplay update embodied in the modification distribution 270 was effective for its intended purpose (e.g., increased gameplay engagement or addressed a skill level issue). As a result, the developer may cause a deployment message 340 to be sent from the developer system 130 to the game resource management system 110.

Once the game resource management system 110 receives the deployment message 340, it may cause the modification distribution 270 to be deployed to the game client devices 150 outside of the target group 170.

Figure 4:
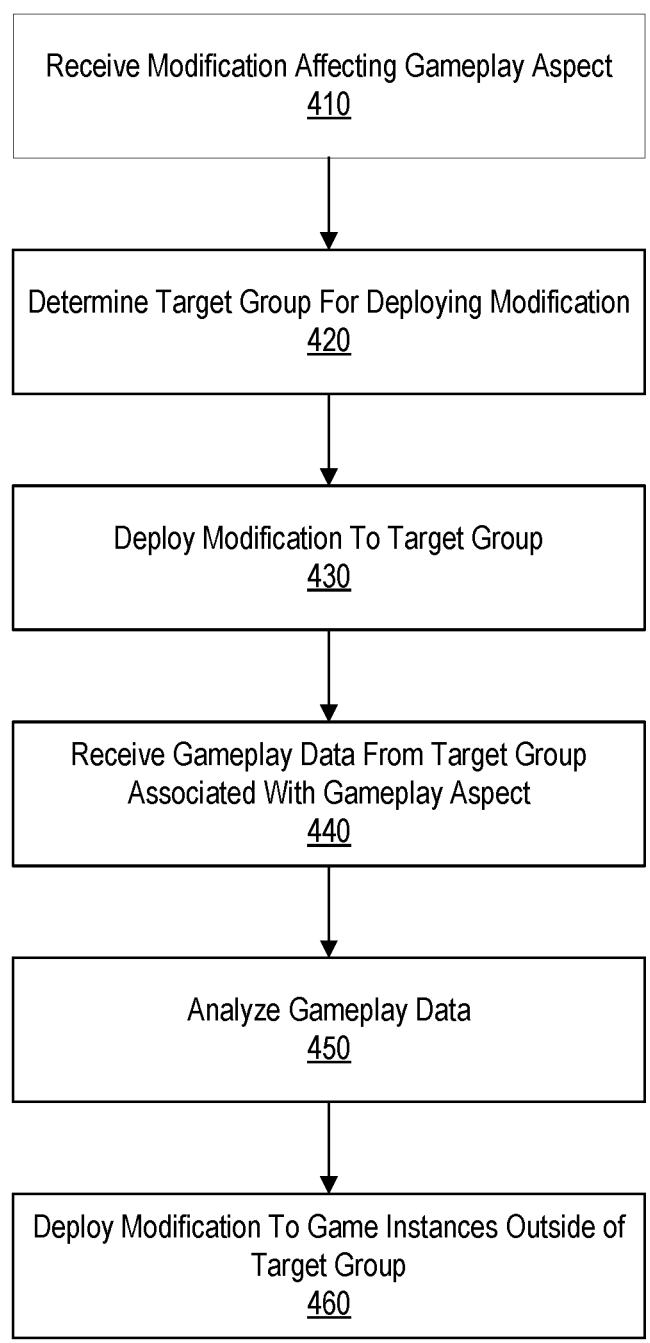
FIG. 4 illustrates a flowchart of an example process for live gameplay updates that can be performed by a game resource management system consistent with disclosed embodiments.

FIG. 4 shows a flowchart representing an example live gameplay management process 400. In some embodiments, process 400 can be performed by the game resource management system 110. Although the following discussion describes the process 400 as being performed by the game resource management system 110, other components of the computing environment 100 may perform one or more blocks of process 400 without departing from the spirit and scope of the present disclosure. In addition, while the discussion below indicates that some operations may be performed by certain identified components of the game resource management system 110 (e.g., game instance manager 115, update manager 123, gameplay data collector 120, and/or gameplay analyzer 127), other of those components may perform those operations in various embodiments.

At block 410, the update manager 123 of the game resource management system 110 may receive a modification of a game that affects a gameplay aspect of the game. The modification may be one that adjusts a parameter related to a gameplay aspect such as an accuracy parameter (e.g., how precise a player's input must be to record a score or hit), a skill parameter (e.g., such as the speed or strength of a character within the game), a parameter related to the efficacy of objects within the game to inflict or resist damage, or parameters related to game physics, for example. The game play aspect of the modification can also be related to, in some embodiments, adding, removing, or changing the layout of the game or the cartography of the game (e.g., new levels, hidden gameplay areas, scenes). Consistent with disclosed embodiments, the modification can be in the form of a data file or parameter file including data that is accessed by a component of the game instance while it is executing (e.g., updated game parameters 273), or the modification can be in the form of the dynamically executable library that can be executed by a component of the game instance while is executing (e.g., updated dynamically loadable binaries 275).

At block 420, the game instance manager 115 of the game resource management system 110 may determine a target group 170 for deploying the modification. According to some embodiments, the game instance manager 115 may determine the target group based on information it receives from the developer system 130. For example, the developer system 130 may provide player information relevant to the gameplay aspect for which the modification applies such as the identification of certain skill levels of players 160, geographic locations of players 160, types of games played by players 160 (outside of the particular at-issue game), or for an RPG or season-long sports game, progress within the game. In some embodiments, the target information may identify specific players 160 or groups of players 160 that developers have identified for testing purposes. The game instance manager 115 may use this information to identify specific game instances 155 executing on game client devices 150 to include within the target group 170.

At block 430, the update manager 123 deploys the modification to the target group 170. The update manager 123 may deploy the modification to the target group 170 using a modification distribution 270, as noted above. For example, the modification distribution 270 may include updated game parameters 273 which may include a properties file, text file, serialized object, or other data that can be used by game instances 155 to affect a gameplay aspect of the game. The modification distribution 270 can also include, or include in the alternative, updated dynamically loadable binaries 275 which can include executable code that game instance 155 can call during the execution.

Once the modification has been deployed to members of the target group 170, game client devices 150 within the target group 170 may provide to the gameplay data collector 120 of the game resource management system 110 gameplay data associated with the gameplay aspect. At block 440, the gameplay data collector 120 can receive the gameplay data. For example, if the gameplay aspect of the modification relates to shooting accuracy in a basketball game, the gameplay data may relate to player engagement after the modification has been incorporated within the game instance 155, giving an idea of whether the modification enhances or diminishes player engagement. As another example, if the gameplay aspect of the modification relates to additional or hidden levels in an adventure or RPG game, the gameplay data may relate to player engagement for finding the additional or hidden levels or playing the additional or hidden levels. The gameplay data may also include information related to success rate of players once the modification has been incorporated within the game instance 155. For example, the gameplay data can be associated with player's win loss record in head-to-head matchups against players with similar skill levels to determine whether the modification has a positive or negative effect on player success in such head-to-head matchups.

At block 450, the gameplay analyzer 127 of game resource management system 110 may analyze the gameplay data received from game instances 155 of the target group 170. In some embodiments, the gameplay analyzer 127 may consolidate the gameplay data into reports that it provides to developer system 130 thereby allowing developers of the game to make decisions regarding whether the modification deployed to the target group 170 should be deployed to game instances 155 that are not part of the target group 170. In such embodiments, the developer system 130 may provide a deployment message to the update manager 123 of the game resource management system 110 providing information that the modification should be deployed to all game instances 155 executing the game, or a subset of game instances 155 executing game that were not part of the target group 170. Upon receiving the deployment message, the update manager 123 may deploy the modification to the game instances 155 outside of the target group 170, at block 460.

In some embodiments, gameplay analyzer 127 can be configured to automatically deploy modifications to game instances 155 outside of the target group 170 when certain threshold parameters have been satisfied. As just one example, if the modification results in a player engagement increase of 15% for the target group, then the update manager 123 may deploy the modification to game client devices 150 outside of the target group 170, at block 460.

In some embodiments, the operations of process 400 may be performed out of the order presented, with additional elements, and/or without some elements. Some of the operations of process 400 may further take place substantially concurrently and, therefore, may conclude in an order different from the order of operations shown above.

Figure 5:
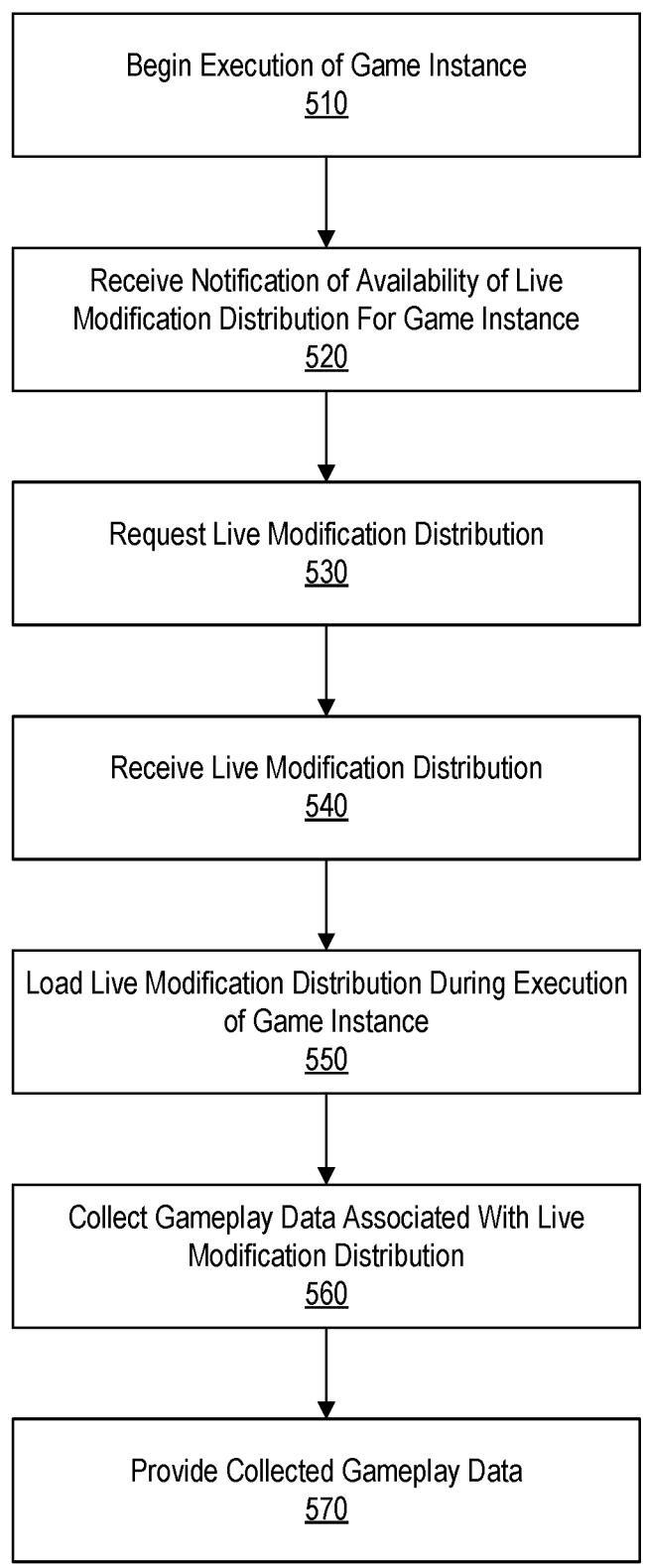
FIG. 5 illustrates a flowchart of an example process for live gameplay updates that can be performed by a game client device consistent with disclosed embodiments.

FIG. 5 shows a flowchart representing an example live gameplay client update process 500. In some embodiments, the process 500 can be performed by game client devices 150. Although the following discussion describes the process 500 as being performed by one or more game client devices 150, other components of computing environment 100 may perform one or more blocks of process 500 without departing from the spirit and scope of the present disclosure.

For example, in embodiments where games are streamed to game client devices 150, game server 113 (or some other component of game resource management system 110) may perform the operations of process 500.

At block 510, game client device 150 begins process 500 by beginning execution of a game instance 155. Execution of the game instance 155 can begin with, in some embodiments, execution of a .INE, .EXE, .PSS, .XEX, .BIN, .NRO, .DOL, or other executable binary file that launches a game instance 155. Once the game client device 150 begins execution of a game instance 155, the game instance 155 executes according to the instructions of its various components, for example as described above with respect to FIG. 2.

As the game instance 155 executes, the game client device 150 may receive a notification of the availability of a modification distribution 270 applicable to the game instance 155, at block 520. The game client device 150 may then request the modification distribution 270 at block 530 and receive it at block 540.

At block 550, the game client device may load the modification distribution 270 while they game instance 155 is executing. As described above, the modification distribution 270 may replace or add game parameters 235 or dynamically loadable binaries 240 that are accessed by the game instance 155 during its execution. In some embodiments, if the game instance 155 is using or accessing game parameters 235 or dynamically loadable binaries 240 impacted by the modification distribution 270 (e.g., the updated game parameters 273 overwrite the accessed game parameters 235 or the updated dynamically loadable binary 275 overwrites the accessed dynamically loadable binaries 240) then the game client device 150 may queue the update, or pause loading of the modification distribution 270, until the game instance 155 ceases using the game parameters 235 and/or the dynamically loadable binaries 240.

After the modification distribution 270 has been loaded, at block 560, the game client device 150 may collect gameplay data associated with the modification distribution 270. In some embodiments, gameplay data collected at block 560 is consistent with gameplay data normally collected during the regular execution of the game instance 155. For example, the gameplay data can include how long a player 160, is playing or engaging with the game instance, particular areas or levels of the game played by the player 160, the success rate for particular tasks within the game, or the success of player 160 against other players of a certain skill level.

At block 570, according to some embodiments, the game client device 150 may provide the collected gameplay data to the gameplay data collector 120 of game resource management system 110. The gameplay data provided may include an identifier of the game instance 155 or the player 160 thereby tagging the gameplay data with an identifier linking the gameplay data to the game instance 155 and/or the player 160.

In some embodiments, the operations of process 500 may be performed out of the order presented, with additional elements, and/or without some elements. Some of the operations of process 500 may further take place substantially concurrently and, therefore, may conclude in an order different from the order of operations shown above.

Figure 6:
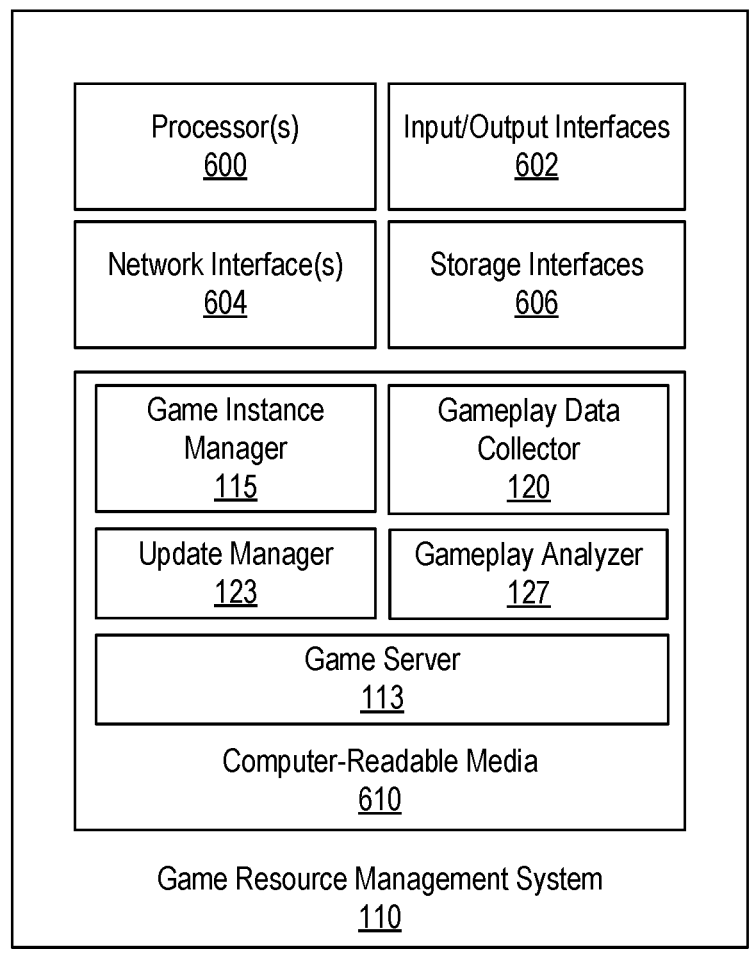
FIG. 6 illustrates a block diagram of an example game resource management system providing live game play updates consistent with disclosed embodiments.

FIG. 6 illustrates a block diagram of an example game resource management system 110 that can enable live gameplay updates in accordance with example embodiments of the disclosure. The game resource management system 110 may include one or more processor(s) 600, one or more input/output (I/O) interface(s) 602, one or more network interface(s) 604, one or more storage interface(s) 606, and computer-readable media 610.

In some implementations, the processors(s) 600 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip system(s) (SOCs), complex programmable logic devices (CPLDs), etc. Additionally, each of the processor(s) 600 may possess its own local memory, which also may store program modules, program data, and/or one or more operating system(s). The one or more processor(s) 600 may include one or more cores.

The one or more input/output (I/O) interface(s) 602 may enable the game resource management system 110 to detect interaction with a user and/or other system(s), such as developer system 130 and/or game client devices 150. The I/O interface(s) 602 may include a combination of hardware, software, and/or firmware and may include software drivers for enabling the operation of any variety of I/O device(s) integrated on the game resource management system 110 or with which the game resource management system 110 interacts, such as displays, microphones, speakers, cameras, switches, and any other variety of sensors, or the like.

The network interface(s) 604 may enable the game resource management system 110 to communicate via the one or more network(s). The network interface(s) 604 may include a combination of hardware, software, and/or firmware and may include software drivers for enabling any variety of protocol-based communications, and any variety of wireline and/or wireless ports/antennas. For example, the network interface(s) 604 may comprise one or more of a cellular radio, a wireless (e.g., IEEE 802.1x-based) interface, a Bluetooth® interface, and the like. In some embodiments, the network interface(s) 604 may include radio frequency (RF) circuitry that allows the game resource management system 110 to transition between various standards. The network interface(s) 604 may further enable the game resource management system 110 to communicate over circuit-switch domains and/or packet-switch domains.

The storage interface(s) 606 may enable the processor(s) 600 to interface and exchange data with the computer-readable medium 610, as well as any storage device(s) external to the game resource management system 110, such as databases, hard drives, cloud storage, memory cards or other storage media.

The computer-readable media 610 may include volatile and/or nonvolatile memory, removable and non-removable media implemented in any method or technology for storage of information, such as computer-readable instructions, data structures, program modules, or other data. Such memory includes, but is not limited to, random access memory (RAM), read-only memory (ROM), electrically erasable programmable read-only memory (EEPROM), flash memory or other memory technology, CD-ROM, digital versatile discs (DVD) or other optical storage, magnetic cassettes, magnetic tape, magnetic disk storage or other magnetic storage devices, RAID storage system(s), or any other medium which can be used to store the desired information and which can be accessed by a computing device. The computer-readable media 610 may be implemented as computer-readable storage media (CRSM), which may be any available physical media accessible by the processor(s) 600 to execute instructions stored on the computer readable media 610. In one basic implementation, CRSM may include RAM and Flash memory. In other implementations, CRSM may include, but is not limited to, ROM, EEPROM, or any other tangible medium which can be used to store the desired information and which can be accessed by the processor(s) 600. The computer-readable media 610 may have an operating system (OS) and/or a variety of suitable applications stored thereon. The OS, when executed by the processor(s) 600 may enable management of hardware and/or software resources of the game resource management system 110.

Several functional blocks having instruction, data stores, and so forth may be stored within the computer-readable media 610 and configured to execute on the processor(s) 600. The computer readable media 610 may have stored thereon a game server 113, a game instance manager 115, a gameplay data collector 120, an update manager 123, and a gameplay analyzer 127, consistent with the embodiments of the present disclosure. Each of these components may include instructions that when executed by the processor(s) 600 may enable various functions pertaining to the operations of the game resource management system 110 as described above with respect to disclosed embodiments.

The illustrated aspects of the claimed subject matter may also be practiced in distributed computing environments where certain tasks are performed by remote processing devices that are linked through a communications network. In a distributed computing environment, program modules can be located in both local and remote memory storage devices.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The disclosure is described above with reference to block and flow diagrams of system(s), methods, apparatuses, and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

Computer-executable program instructions may be loaded onto a general purpose computer, a special-purpose computer, a processor, or other programmable data processing apparatus to produce a particular machine, such that the instructions that execute on the computer, processor, or other programmable data processing apparatus for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction that implement one or more functions specified in the flow diagram block or blocks. As an example, embodiments of the disclosure may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

It will be appreciated that each of the memories and data storage devices described herein can store data and information for subsequent retrieval. The memories and datastores can be in communication with each other and/or other datastores, such as a centralized datastore, or other types of data storage devices. When needed, data or information stored in a memory or datastore may be transmitted to a centralized datastore capable of receiving data, information, or data records from more than one datastore or other data storage devices. In other embodiments, the datastores shown can be integrated or distributed into any number of datastores or other data storage devices.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
receiving, by a computing system, a modification for a videogame, the modification affecting a gameplay aspect of the videogame during execution of the videogame;
determining, by the computing system, a target group for deploying the modification, the target group including first one or more live instances of the videogame;
deploying, by the computing system, the modification to the target group, the modification being deployed as computer-readable data configured to implement the modification to a live instance of the videogame during live gameplay of the videogame, the live gameplay being by a player associated with the live instance of the videogame;
receiving, by the computing system and from the target group, gameplay data associated with the gameplay aspect of the videogame during execution of the videogame with the modification deployed;
analyzing the received gameplay data associated with the gameplay aspect of the videogame during execution of the videogame with the modification deployed;
determining, based on the analyzing of the received gameplay data associated with the gameplay aspect of the videogame during execution of the videogame with the modification deployed, to deploy the same modification to second one or more live instances of the videogame; and
deploying, by the computing system and in response to the determining to deploy the same modification to the second one or more live instances of the videogame, the same modification to the second one or more live instances of the videogame.

2. The method of claim 1 wherein determining the target group includes a manual selection of at least one of the first one or more live instances of the videogame.

3. The method of claim 1 wherein determining the target group includes a selection of at least one of the first one or more live instances of the videogame based on player skill levels associated with the first one or more live instances of the videogame.

4. The method of claim 1 wherein the modification includes changing a skill attribute value and wherein the gameplay aspect has a dependency on the skill attribute value.

5. The method of claim 1 wherein the modification includes an alteration to cartography of the videogame.

6. The method of claim 1 wherein analyzing the received gameplay data includes analyzing gameplay engagement metrics.

7. The method of claim 1, further comprising:
determining, by the computing system, a second target group for deploying a second modification, the second target group including third one or more live instances of the videogame and the second modification affecting the gameplay aspect of the videogame during execution of the videogame;
deploying, by the computing system, the second modification to the second target group;
receiving, by the computing system and from the second target group, second gameplay data associated with the gameplay aspect of the videogame during execution of the videogame with the second modification deployed; and
analyzing the received second gameplay data associated with the gameplay aspect of the videogame during execution of the videogame with the second modification deployed,
wherein the determining to deploy the same modification to the second one or more live instances of the videogame is further based on a determining that one or more gameplay engagement metrics were higher during execution of the videogame with the modification deployed than during execution of the videogame with the second modification deployed.

8. A system comprising:
one or more processors; and
one or more non-transitory computer-readable media storing computer-executable instructions that, when executed by the one or more processors, cause the one or more processors to perform operations comprising:
receiving, by the system, a modification for a videogame, the modification affecting a gameplay aspect of the videogame during execution of the videogame;
determining, by the system, a target group for deploying the modification, the target group including first one or more live instances of the videogame;
deploying, by the system, the modification to the target group, the modification being deployed as computer-readable data configured to implement the modification to a live instance of the videogame during live gameplay of the videogame, the live gameplay being by a player associated with the live instance of the videogame;

receiving, by the system and from the target group, gameplay data associated with the gameplay aspect of the videogame during execution of the videogame with the modification deployed;

analyzing the received gameplay data associated with the gameplay aspect of the videogame during execution of the videogame with the modification deployed;

determining, based on the analyzing of the received gameplay data associated with the gameplay aspect of the videogame during execution of the videogame with the modification deployed, to deploy the same modification to second one or more live instances of the videogame, wherein the second one or more live instances of the videogame are not included within the target group; and deploying, by the system and in response to the determining to deploy the same modification to the second one or more live instances of the videogame, the same modification to the second one or more live game instances of the videogame.

9. The system of claim 8, wherein determining the target group includes a manual selection of at least one of the first one or more live instances of the videogame.

10. The system of claim 8, wherein determining the target group includes a selection of at least one of the first one or more live instances of the videogame based on player skill levels associated with the first one or more live instances of the videogame.

11. The system of claim 8, wherein the modification includes changing a skill attribute value and wherein the gameplay aspect has a dependency on the skill attribute value.

12. The system of claim 8, wherein the modification includes an alteration to cartography of the videogame.

13. The system of claim 8, wherein analyzing the received gameplay data includes analyzing gameplay engagement metrics.

14. The system of claim 8, the operations further comprising:

determining, by the system, a second target group for deploying a second modification, the second target group including third one or more live instances of the videogame and the second modification affecting the gameplay aspect of the videogame during execution of the videogame;

deploying, by the system, the second modification to the second target group;

receiving, by the system and from the second target group, second gameplay data associated with the gameplay aspect of the videogame during execution of the videogame with the second modification deployed; and analyzing the received second gameplay data associated with the gameplay aspect of the videogame during execution of the videogame with the second modification deployed, wherein the determining to deploy the same modification to the second one or more live instances of the videogame is further based on a determining that one or more gameplay engagement metrics were higher during execution of the videogame with the modification deployed than during execution of the videogame with the second modification deployed.

15. A method comprising:

receiving, by a first computer system and from a second computer system executing an integrated development environment for videogame development, a modification for a videogame, the modification affecting a gameplay aspect of the videogame during execution of the videogame;

providing, by the first computer system and to a first plurality of game client devices executing an instance of the videogame, a notification that the modification is available;

receiving, by the first computer system and from requesting game client devices, requests to provide the modification, wherein the requesting game client devices are among the first plurality of game client devices executing an instance of the videogame;

deploying, by the first computer system, the modification to the requesting game client devices, the modification being deployed as computer-readable data configured to implement the modification to a live instance of the videogame during live gameplay of the videogame, the live gameplay being by a player associated with the live instance of the videogame;

receiving, by the first computer system and from the requesting game client devices, gameplay data associated with the gameplay aspect of the videogame during execution of the videogame with the modification deployed;

analyzing the received gameplay data associated with the gameplay aspect of the videogame during execution of the videogame with the modification deployed;

determining to deploy the same modification to a second plurality of game client devices executing an instance of the videogame when the analyzing of the received gameplay data associated with the gameplay aspect of the videogame during execution of the videogame with the modification deployed shows an increase in gameplay engagement, wherein members of the second plurality of game client devices are not among the requesting game client devices; and deploying, by the first computer system and in response to the determining to deploy the same modification to the second plurality of game client devices executing an instance of the videogame, the same modification to the second plurality of game client devices executing the instance of the videogame.

16. The method of claim 15, further comprising determining, by the first computer system, a target group for deploying the modification, wherein the target group includes one or more game client devices among the first plurality of game client devices executing an instance of the videogame and the target group includes the requesting game client devices.

17. The method of claim 16, wherein determining the target group includes a manual selection of at least one of the one or more game client devices among the first plurality of game client devices executing the instance of the videogame.

18. The method of claim 16, wherein determining the target group includes a selection of at least one of the one or more game client devices based on player skill levels associated with the one or more game client devices.

19. The method of claim 15, wherein the modification includes changing a skill attribute value and wherein the gameplay aspect has a dependency on the skill attribute value.

20. The method of claim 15, wherein analyzing the received gameplay data includes analyzing gameplay engagement metrics.

* * * * *